(12) United States Patent
Choi

(10) Patent No.: US 8,140,126 B2
(45) Date of Patent: Mar. 20, 2012

(54) MOBILE TERMINAL AND CONTROL METHOD THEREOF

(75) Inventor: Hye-Jin Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 274 days.

(21) Appl. No.: 12/427,349

(22) Filed: Apr. 21, 2009

(65) Prior Publication Data

US 2010/0167788 A1 Jul. 1, 2010

(30) Foreign Application Priority Data

Dec. 29, 2008 (KR) .......................... 10-2008-0136083

(51) Int. Cl.
*H04B 1/38* (2006.01)
(52) U.S. Cl. .................. 455/566; 455/575.1; 455/550.1; 455/466; 345/156; 345/169; 345/173; 715/835; 382/131
(58) Field of Classification Search .................. 455/566, 455/575.1, 550.1, 466; 345/169, 156, 173; 715/835; 382/131
See application file for complete search history.

(56) References Cited

U.S. PATENT DOCUMENTS

| 2008/0119211 | A1* | 5/2008 | Paas et al. ..................... 455/466 |
| 2009/0079765 | A1* | 3/2009 | Hoover ......................... 345/660 |
| 2009/0144661 | A1* | 6/2009 | Nakajima et al. ............. 715/835 |
| 2009/0163250 | A1* | 6/2009 | Park ............................. 455/566 |
| 2009/0207184 | A1* | 8/2009 | Laine et al. ................... 345/619 |

* cited by examiner

*Primary Examiner* — Dwayne Bost
*Assistant Examiner* — Amancio Gonzalez
(74) *Attorney, Agent, or Firm* — KED & Associates, LLP

(57) ABSTRACT

Disclosed are a mobile terminal capable of automatically displaying information relating to specific objects among objects displayed on a screen according to a user's manipulation, and a control method thereof. The method comprises: detecting a manipulated state of a mobile terminal by a controller; and automatically displaying information relating to specific objects among objects displayed on a screen based on the detected manipulated state of the mobile terminal. Accordingly, a user's convenience is enhanced, and even a novice not accustomed to functions of the mobile terminal can easily handle the mobile terminal.

29 Claims, 14 Drawing Sheets

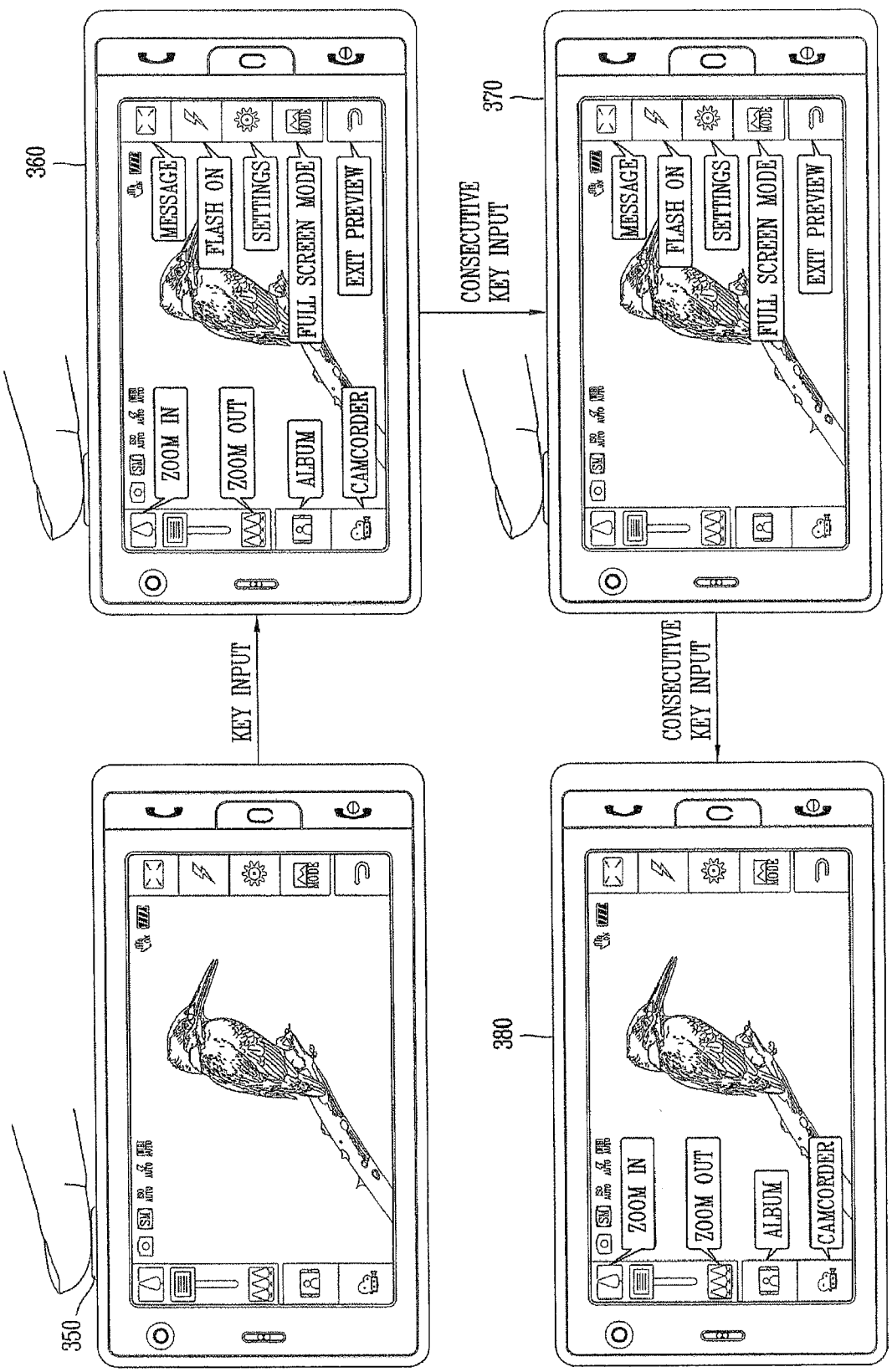

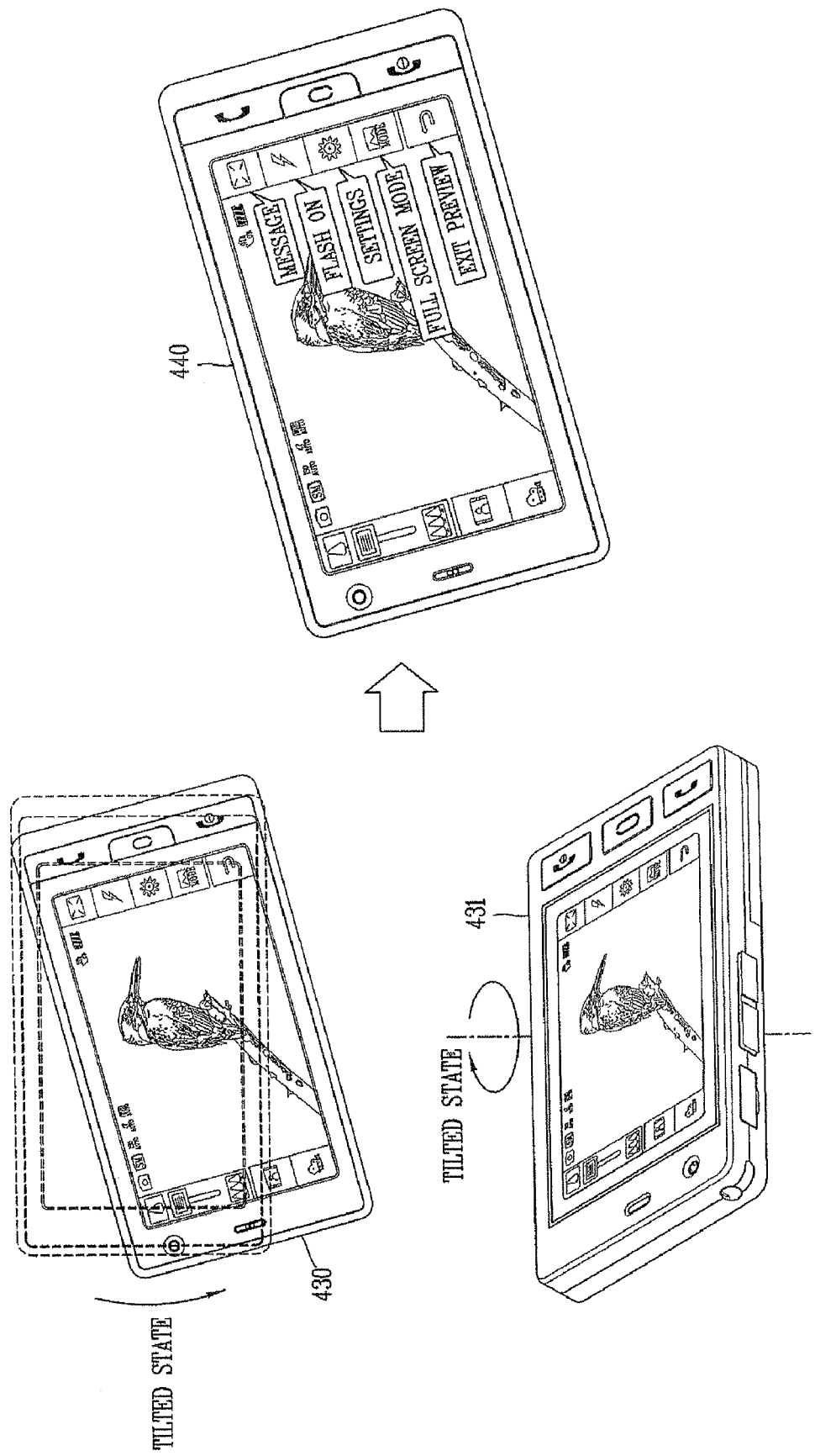

MOBILE TERMINAL AND CONTROL METHOD THEREOF

RELATED APPLICATION

The present disclosure relates to subject matter contained in priority Korean Application No. 10-2008-0136083, filed on Dec. 29, 2008, which is herein expressly incorporated by reference in its entirety.

BACKGROUND OF THE INVENTION

1. Field of the Invention

The present invention relates to a mobile terminal and a control method thereof, and particularly, to a mobile terminal capable of automatically displaying information relating to specific objects among objects displayed on a screen according to a user's manipulation for enhanced convenience, and a control method thereof.

2. Background of the Invention

In general, a terminal may be classified into a mobile (portable) terminal and a stationary terminal according to a moveable state. The terminal may be also classified into a handheld terminal and a vehicle mount terminal according to a user's carriage method.

As the mobile terminal has various functions, complicated functions such as a function for capturing a still image or a moving image, a function for reproducing a music file or a moving image, a game function, and a function for receiving broadcasting data are provided at the portable terminal. The portable terminal is implemented as a multimedia player. In order to support and enhance functions of the terminal, structural and/or software parts of the terminal are required to be upgraded.

The mobile terminal is provided with various function keys to execute each kind of functions. The function keys are generally displayed on a screen by using icons. In order to display icons as much as possible on a minimized display region, the icons are configured to have shapes that can be immediately recognized by a user.

However, those who are not accustomed to using the mobile terminal have to directly execute the respective icons, or have to refer to a guide book, since they do not precisely know meanings of the icons.

SUMMARY OF THE INVENTION

Therefore, an object of the present invention is to provide a mobile terminal capable of having its manipulation state detected, and capable of automatically displaying information relating to specific objects among objects displayed on a screen based on the detected manipulation.

To achieve these and other advantages and in accordance with the purpose of the present invention, as embodied and broadly described herein, there is provided a mobile terminal, comprising: a user input unit; a display unit configured to receive a user's touch input, and to display object-related information; and a controller configured to control information relating to specific objects among objects displayed on the display unit according to manipulation of the user's input unit or the display unit.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 7A to 7F are examples showing a menu displaying method when a command to display help information is inputted according to the present invention.

DETAILED DESCRIPTION OF THE INVENTION

Description will now be given in detail of the present invention, with reference to the accompanying drawings.

The present invention is to provide a mobile terminal capable of automatically displaying information relating to specific objects among objects displayed on a screen according to a user's manipulation, and a control method thereof.

The present invention is to provide a mobile terminal capable of selectively displaying information relating to objects displayed on a screen according to a user's manipulation to instruct display of help information, and a control method thereof.

The present invention is to provide a mobile terminal capable of automatically displaying functions provided thereat, files stored therein, or information relating to web pages accessed therethrough, and a control method thereof.

Hereinafter, a mobile terminal according to the present invention will be explained in more detail with reference to the attached drawings. The suffixes attached to components of the mobile terminal, such as 'module' and 'unit' were used for facilitation of the detailed description of the present invention. Therefore, the suffixes do not have different meanings from each other.

The mobile terminal according to the present invention may include a portable phone, a smart phone, a laptop computer, a digital broadcasting terminal, Personal Digital Assistants (PDA), a Portable Multimedia Player (PMP), a navigation, etc. It is obvious to those skilled in the art that the preferred embodiments of the present invention can be applied not only to mobile terminals, but also to stationary terminals such as a digital TV and a desk top.

Figure 1:
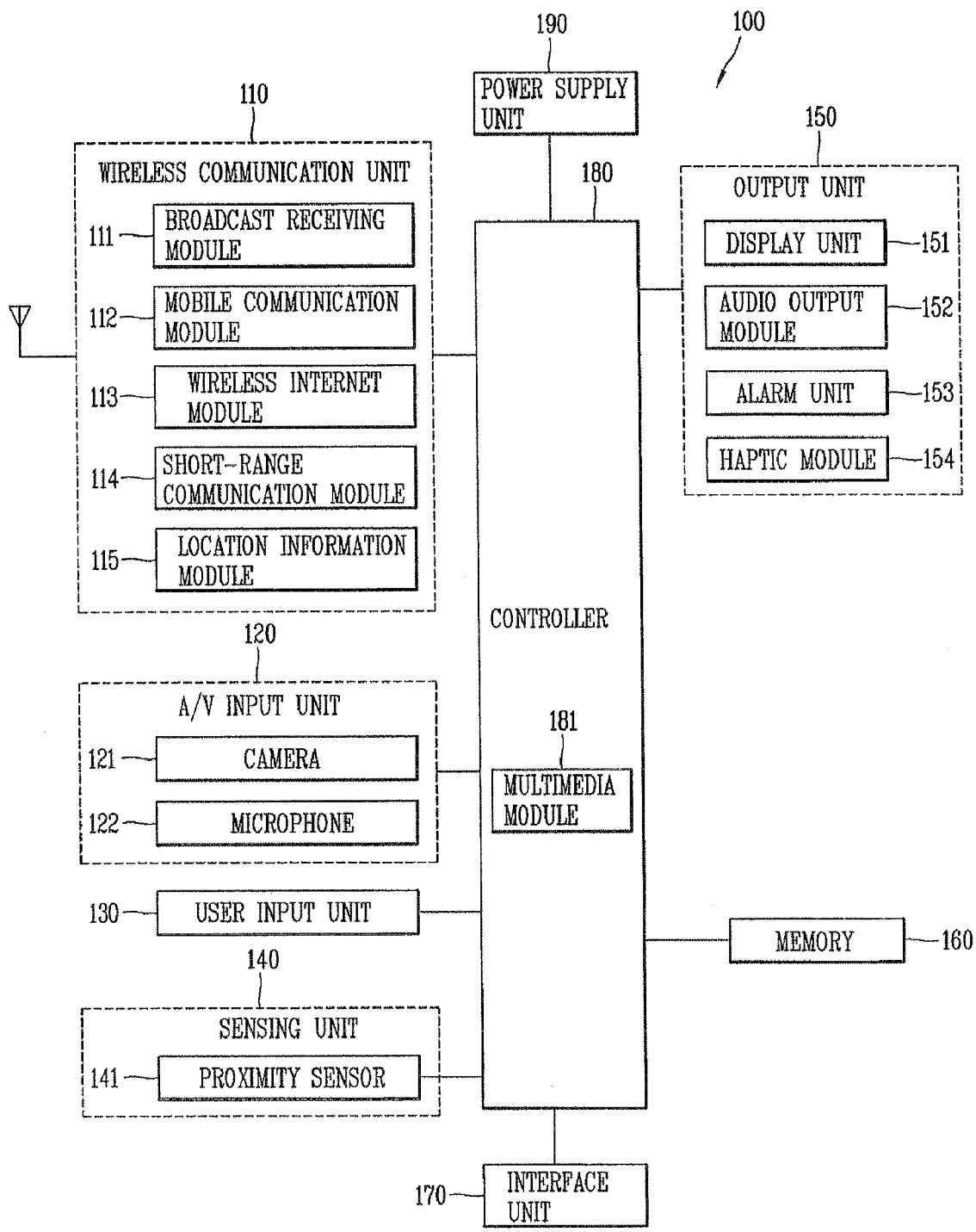
FIG. 1 is a block diagram of a mobile terminal according to a first embodiment of the present invention.

FIG. 1 is a block diagram showing a mobile terminal according to a first embodiment of the present invention.

As shown, the mobile terminal 100 includes a wireless communication unit 110 having one or more components which permits wireless communication between the mobile terminal 100 and a wireless communication system or network within which the mobile terminal is located.

For example, the wireless communication unit 110 includes a broadcast receiving module 111 that receives a broadcast signal and/or broadcast associated information from an external broadcast managing entity via a broadcast channel. The broadcast channel may include a satellite channel and a terrestrial channel.

In addition, the broadcast managing entity generally refers to a system which transmits a broadcast signal and/or broadcast associated information. Examples of broadcast associated information include information associated with a broadcast channel, a broadcast program, a broadcast service provider, etc. For instance, broadcast associated information may include an electronic program guide (EPG) of digital multimedia broadcasting (DMB) and electronic service guide (ESG) of digital video broadcast-handheld (DVB-H).

In addition, the broadcast signal may be implemented as a TV broadcast signal, a radio broadcast signal, and a data broadcast signal, among others. The broadcast signal may further include a broadcast signal combined with a TV or radio broadcast signal.

The broadcast receiving module 111 is also configured to receive broadcast signals transmitted from various types of broadcast systems. For example, such broadcasting systems include the digital multimedia broadcasting-terrestrial (DMB-T) system, the digital multimedia broadcasting-satellite (DMB-S) system, the digital video broadcast-handheld (DVB-H) system, the data broadcasting system known as media forward link only (MediaFLO®) and the integrated services digital broadcast-terrestrial (ISDB-T) system among others. Receiving multicast signals is also possible. Further, data received by the broadcast receiving module 111 may be stored in a suitable device, such as a memory 160.

The wireless communication unit 110 also includes a mobile communication module 112 that transmits/receives wireless signals to/from one or more network entities (e.g., base station, Node-B). Such signals may represent audio, video, multimedia, control signaling, and data, among others.

Also included is a wireless Internet module 113 that supports Internet access for the mobile terminal. The module 113 may be internally or externally coupled to the terminal. The wireless communication unit 110 also includes a short-range communication module 114 that facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

A position-location module 115 is also included in the wireless communication unit 110 and identifies or otherwise obtains the location of the mobile terminal 100. The position-location module 115 may be implemented using global positioning system (GPS) components which cooperate with associated satellites, network components, and combinations thereof.

In addition, as shown in FIG. 1, the mobile terminal 100 also includes an Audio/video (A/V) input unit 120 that provides audio or video signals to the mobile terminal 100. As shown, the A/V input unit 120 includes a camera 121 and a microphone 122. The camera 121 receives and processes image frames of still pictures or video.

Further, the microphone 122 receives an external audio signal while the portable device is in a particular mode, such as a phone call mode, recording mode and voice recognition mode. The received audio signal is then processed and converted into digital data. Also, the portable device, and in particular, the A/V input unit 120, includes assorted noise removing algorithms to remove noise generated in the course of receiving the external audio signal. In addition, data generated by the A/V input unit 120 may be stored in the memory 160, utilized by an output unit 150, or transmitted via one or more modules of the communication unit 110. If desired, two or more microphones and/or cameras may be used.

The mobile terminal 100 also includes a user input unit 130 that generates input data responsive to user manipulation of an associated input device or devices. Examples of such devices include a keypad, a dome switch, a touchpad (e.g., static pressure/capacitance), a jog wheel and a jog switch. A specific example is one in which the user input unit 130 is configured as a touchpad in cooperation with a touch screen display, which will be described in more detail below.

A sensing unit 140 is also included in the mobile terminal 100 and provides status measurements of various aspects of the mobile terminal 100. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100, etc.

As an example, when the mobile terminal 100 is a slide-type mobile terminal, the sensing unit 140 may sense whether a sliding portion of the mobile terminal 100 is open or closed. Other examples include the sensing unit 140 sensing the presence or absence of power provided by a power supply unit 190, the presence or absence of a coupling or other connection between an interface unit 170 and an external device, etc.

Further, the interface unit 170 is often implemented to couple the mobile terminal 100 with external devices. Typical external devices include wired/wireless headphones, external chargers, power supplies, storage devices configured to store data (e.g., audio, video, pictures, etc.), earphones, and microphones, among others. In addition, the interface unit 170 may be configured using a wired/wireless data port, a card socket (e.g., for coupling to a memory card, a subscriber identity module (SIM) card, a user identity module (UIM) card, a removable user identity module (RUIM) card, etc.), audio input/output ports and video input/output ports.

The output unit 150 generally includes various components which support the output requirements of the mobile terminal 100. The mobile terminal 100 also includes a display unit 151 that visually displays information associated with the mobile terminal 100. For instance, if the mobile terminal 100 is operating in a phone call mode, the display unit 151 will generally provide a user interface or graphical user interface which includes information associated with placing, conducting, and terminating a phone call. As another example, if the mobile terminal 100 is in a video call mode or a photographing mode, the display unit 151 may additionally or alternatively display images which are associated with these modes.

Further, the display unit 151 also preferably includes a touch screen working in cooperation with an input device, such as a touchpad. This configuration permits the display unit 151 to function both as an output device and an input device. In addition, the display unit 151 may be implemented using display technologies including, for example, a liquid crystal display (LCD), a thin film transistor-liquid crystal display (TFT-LCD), an organic light-emitting diode display (OLED), a flexible display and a three-dimensional display. Some of the above display units may be configured as transparent or transmissive type of display units. These display units may be referred to as 'transparent display units', and include a Transparent OLED (TOLED) as a representative example. The display unit may also be configured to have a transmissive rear structure. This structure allows a user to view an object positioned at a rear side of the terminal body through the display unit 151.

The mobile terminal 100 may also include one or more of such display units 151. An example of a two-display embodiment is one in which one display is configured as an internal display (viewable when the terminal is in an opened position) and a second display configured as an external display (viewable in both the open and closed positions).

When the display unit 151 and a sensor to sense a touch operation (hereinafter, will be referred to as 'touch sensor') have a structure to be layered with each other, the display unit 151 may serve as an input device as well as an output device. The touch sensor may be implemented as a touch film, a touch sheet, a touch pad, and so on.

The touch sensor may be configured to convert changes of a pressure applied to a specific portion of the display unit 151, or changes of a capacitance occurring from a specific portion of the display unit 151, into electric input signals. The touch sensor may be configured to sense not only a touch position and a touch area, but also a touch pressure.

Once touch inputs are sensed by the touch sensor, corresponding signals are transmitted to a touch controller. The touch controller processes the signals, and then transmits corresponding data to the controller 180. Accordingly, the controller 180 can sense a touch position on the display unit 151.

Referring to FIG. 1, a proximity sensor 141 may be arranged at an inner region of the mobile terminal covered by the touch screen, or near the touch screen. The proximity sensor 141 indicates a sensor to sense presence or absence of an object approaching to a surface to be sensed, or an object disposed near a surface to be sensed, by using an electric field or infrared rays without a mechanical contact. The proximity sensor has a longer lifespan and a more enhanced utilization degree than a contact sensor.

The proximity sensor may include a transmissive type photoelectric sensor, a direct reflective type photoelectric sensor, a mirror reflective type photoelectric sensor, a high-frequency oscillation type proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electric field. In this case, the touch screen (touch sensor) may be categorized into a proximity sensor.

Hereinafter, a status that the pointer is positioned to be proximate onto the touch screen without contact will be referred to as 'proximity touch', whereas a status that the pointer substantially comes in contact with the touch screen will be referred to as 'contact touch'. The pointer in a status of 'proximity touch' is positioned so as to be vertical with respect to the touch screen.

The proximity sensor senses proximity touch, and proximity touch patterns (e.g., distance, direction, speed, time, position, moving status, etc.). Information relating to the sensed proximity touch, and the sensed proximity touch patterns may be output onto the touch screen.

An audio output module 152 may output audio data received from the wireless communication unit 110 or stored in the memory 160, in a call-receiving mode, a call-placing mode, a recording mode, a voice recognition mode, a broadcast reception mode, a route guidance mode, and so on. The audio output module 152 may output audio signals relating to functions performed in the mobile terminal 100, e.g., call signal reception sound and message reception sound. The audio output module 152 may include a receiver, a speaker, a buzzer, and so on.

An alarm unit 153 outputs signals notifying occurrence of events from the mobile terminal 100. The events occurring from the mobile terminal 100 may include call signal reception, message reception, a key signal input, a touch input, and so on. The alarm unit 153 may output not only video or audio signals, but also other types of signals such as signals notifying occurrence of events in a vibration manner. The video or audio signals may be output through the display unit 151 or the audio output module 152. Accordingly, the display unit 151 and the audio output module 152 may be categorized into some parts of the alarm unit 153.

An haptic module 154 generates various tactile effects. A representative example of the tactile effects generated by the haptic module 154 includes vibration. Vibration generated by the haptic module 154 may have a controllable strength, a controllable pattern, and so on. For instance, different vibration may be output in a synthesized manner or in a sequential manner.

The haptic module 154 may generate various tactile effects including not only vibration, but also arrangement of pins vertically moving with respect to a skin surface contacting the haptic module 154, air injection force or air suction force through an injection hole or a suction hole, touch by a skin surface, presence or absence of contact with an electrode, effects by stimulus such as an electrostatic force, and reproduction of cold or hot feeling using a heat absorbing device or a heat emitting device.

The haptic module 154 may be configured to transmit tactile effects through a user's direct contact, or a user's muscular sense using a finger or a hand. The haptic module 154 may be implemented in two or more in number according to a configuration of the mobile terminal 100.

The memory 160 may store programs to operate the controller 180, or may temporarily store input/output data (e.g., phonebook, messages, still images, moving images, etc.). The memory 160 may store data relating to vibration and sound of various patterns output when touches are input onto the touch screen.

The memory 160 may be implemented using any type or combination of suitable memory or storage devices including a flash memory type, a hard disk type, a multimedia card micro type, a card type (SD or XD memory), random access memory (RAM), static random access memory (SRAM), electrically erasable programmable read-only memory (EEPROM), programmable read-only memory (PROM), read-only memory (ROM), magnetic memory, magnetic or optical disk, or other similar memory or data storage device. The mobile terminal 100 may operate on the Internet in association with a web storage that performs a storage function of the memory 160.

The interface unit 170 interfaces the mobile terminal 100 with all external devices connected to the mobile terminal 100. The interface unit 170 receives data or power from an external device, and transmits it to each component inside the mobile terminal 100. Otherwise, the interface unit 170 transmits data inside the mobile terminal 100 to an external device. The interface unit 170 may include a wire/wireless headset port, an external charger port, a wire/wireless data port, a memory card port, a port to connect a device having an identification module to the mobile terminal 100, an audio Input/Output (I/O) port, a video Input/Output (I/O) port, an earphone port, and so on.

A recognition module is implemented as a chip to store each kind of information to identify an authorization right for the mobile terminal 100, and may include a User Identity Module (UIM), a Subscriber Identity Module (SIM), a Universal Subscriber Identity Module (USIM), and so on. A device having the recognition module (hereinafter, will be referred to as 'identification device') may be implemented as a smart card type. Accordingly, the identification device may be connected to the mobile terminal 100 through a port.

When the mobile terminal 100 is connected to an external cradle, the interface unit 170 may serve as a passage through which power from the external cradle is supplied to the mobile terminal 100, or a passage through which each kind of command signals input from the external cradle by a user are transmitted to the mobile terminal 100. Said each kind of command signals input from the external cradle, or said power may operate as signals for recognizing that the mobile terminal 100 has been precisely mounted to the external cradle.

The controller 180 control an overall operation of the mobile terminal 100. For instance, the controller 180 performs controls and processes relating to data communication, video call, voice call, etc. The controller 180 may include a multimedia module 181 configured to play multimedia. The multimedia module 181 may be implemented inside the controller 180, or may be separately implemented from the controller 180.

The controller 180 may perform a pattern recognition process to recognize handwriting inputs or picture inputs on the touch screen, as texts or images, respectively.

The power supply unit 190 may receive external power or inner power, thereby supplying the power to each component under control of the controller 180.

In addition, the above various embodiments may be implemented in a computer-readable medium using, for example, computer software, hardware, or some combination thereof.

For a hardware implementation, the embodiments described above may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments are implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in a memory (for example, the memory 160), and executed by a controller or processor (for example, the controller 180).

Figure 2A:
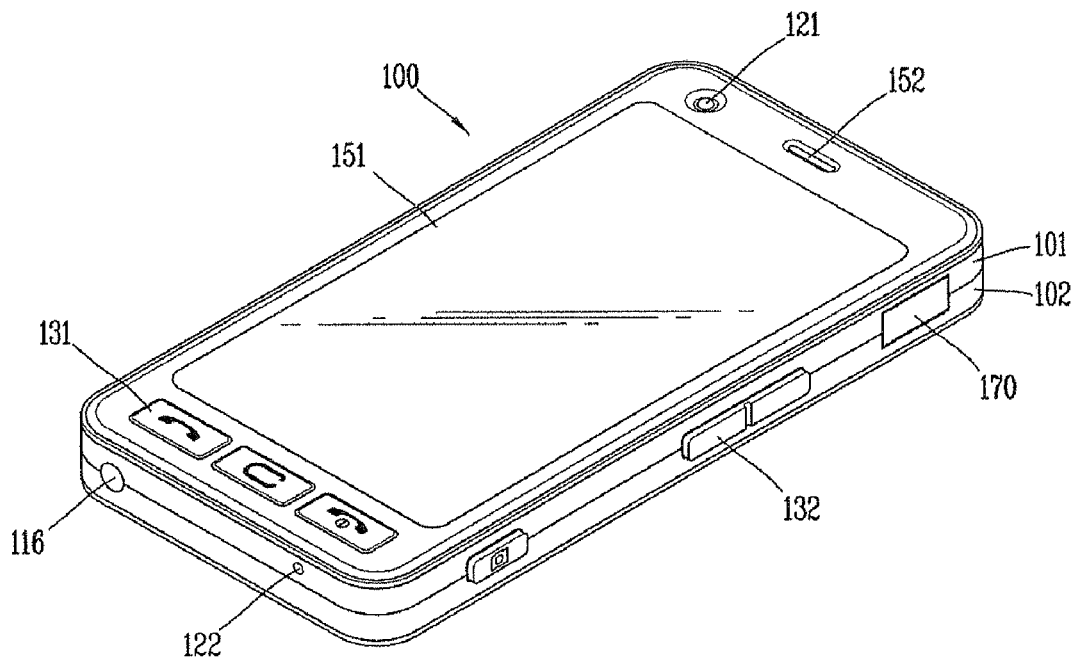
FIG. 2A is a front perspective view of the mobile terminal according to a first embodiment of the present invention.

FIG. 2A is a front perspective view of the mobile terminal according to the present invention.

The mobile terminal 100 of the present invention is provided with a bar type of terminal body. However, the mobile terminal 100 may be implemented in a variety of different configurations. Examples of such configurations include a folder-type, slide-type that two or more bodies are coupled to each other so as to perform relative motion, swing-type, swivel type, and combinations thereof.

The terminal body includes a case that forms appearance of the mobile terminal 100, such as a casing, a housing, and a cover. The case may be classified into a front case 101 and a rear case 102. Various electronic components may be disposed in a space between the front case 101 and the rear case 102. One or more intermediate cases may additionally be disposed between the front case 101 and the rear case 102.

The cases may be formed of resin in a manner of injection molding, or may be formed using metallic materials such as stainless steel (STS) and titanium (Ti).

The display unit 151, the audio output module 152, the camera 121 or the user input unit 130/131, 132, the microphone 122, the interface 170, etc. may be disposed at the front case 101 of the terminal body.

The display unit 151 occupies most parts of the front case 101. The audio output module 152 and the camera 121 are disposed at regions adjacent to one of both ends of the display unit 151, and the user input unit 131 and the microphone 122 are disposed at regions adjacent to another of both ends of the display unit 151. The user input unit 130, the interface 170, etc. may be disposed on side surfaces of the front case 101 and the rear case 102.

The user input unit 130 are manipulated to receive commands for controlling the operation of the mobile terminal 100, and may include a plurality of user input units. The user input units 131 and 132 may be referred to as manipulating portions, and may include any types as long as they can be manipulated by a user's tactile manner.

Commands input by the first and second user units 131 and 132 may be variously set. For instance, the first user input unit 131 is used for inputting commands such as START, END, SCROLL or the like, and the second user input unit 132 is used for inputting commands to control a level of sound output from the audio output unit 152, or commands to convert a current mode of the display unit 151 into a touch recognition mode.

Figure 2B:
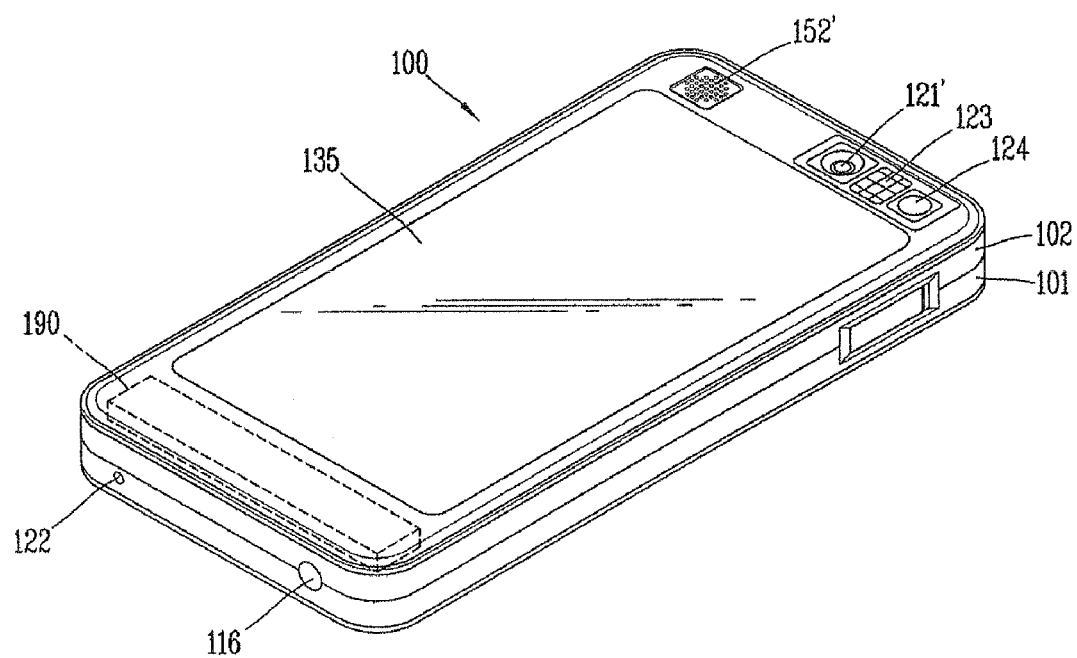
FIG. 2B is a rear perspective view of the mobile terminal according to a first embodiment of the present invention.

FIG. 2B is a rear perspective view of the mobile terminal of FIG. 2A.

Referring to FIG. 2B, a camera 121' may be additionally mounted to the rear case 102 of the terminal body. The camera 121' faces a direction which is opposite to a direction faced by the camera 121 (refer to FIG. 2A), and may have different pixels from those of the camera 121.

For example, the camera 121 is preferably configured to operate with relatively lower pixels so as to immediately transmit a user's face captured in a video call, etc. to another party, whereas the camera 121 of the second body 205 is configured to operate with relatively higher pixels such that it can be useful for a user to obtain higher quality pictures for later use. The camera 121 and 121' may be installed at the terminal body so as to be rotatable or pop-up.

A flash 123 and a mirror 124 may additionally be disposed adjacent to the camera 121'. The flash 123 operates in conjunction with the camera 121' when taking a picture using the camera 121'. The mirror 124 can cooperate with the camera 121' to allow a user to photograph himself or herself in a self-portrait mode.

An audio output unit 152' may be additionally disposed on a rear surface of the terminal body. The audio output unit 152' may implement a stereo function together with the audio output unit 152 of FIG. 2A, and may be used as a speaker phone in a call mode.

A broadcasting signal receiving antenna 116 as well as a calling antenna may be additionally disposed on a side surface of the terminal body. The antenna 116 constituting a part of the broadcasting receiving module 111 (refer to FIG. 1) may be installed to be retractable from the terminal body.

The power supply unit 190 for supplying power to the mobile terminal 100 is mounted to the terminal body. The power supply unit 190 may be mounted in the terminal body, or may be detachably mounted to an outer surface of the terminal body.

A touch pad 135 for sensing touch input may be additionally mounted to the rear case 102. The touch pad 135 may be also configured in a light transmissive type like the display unit 151. Here, if the display unit 151 is configured to output visual information from both surfaces thereof, the visual information can be also recognized through the touch pad 135. All of the visual information output from both surfaces of the display unit 151 may be controlled by the touch pad 135. Alternatively, as a display is additionally mounted to the touch pad 135, a touch screen may be disposed at the rear case 102.

The touch pad 135 may operate with interworking with the display unit 151 of the front case 101. The touch pad 135 may be arranged on a rear surface of the display unit 151 in parallel to the display unit 151. The touch pad 135 may have a size equal to or smaller than that of the display unit 151.

Hereinafter, with reference to FIGS. 3A and 3B, will be explained an interworking operation between the display unit 151 and the touch pad 135.

Figure 3A:
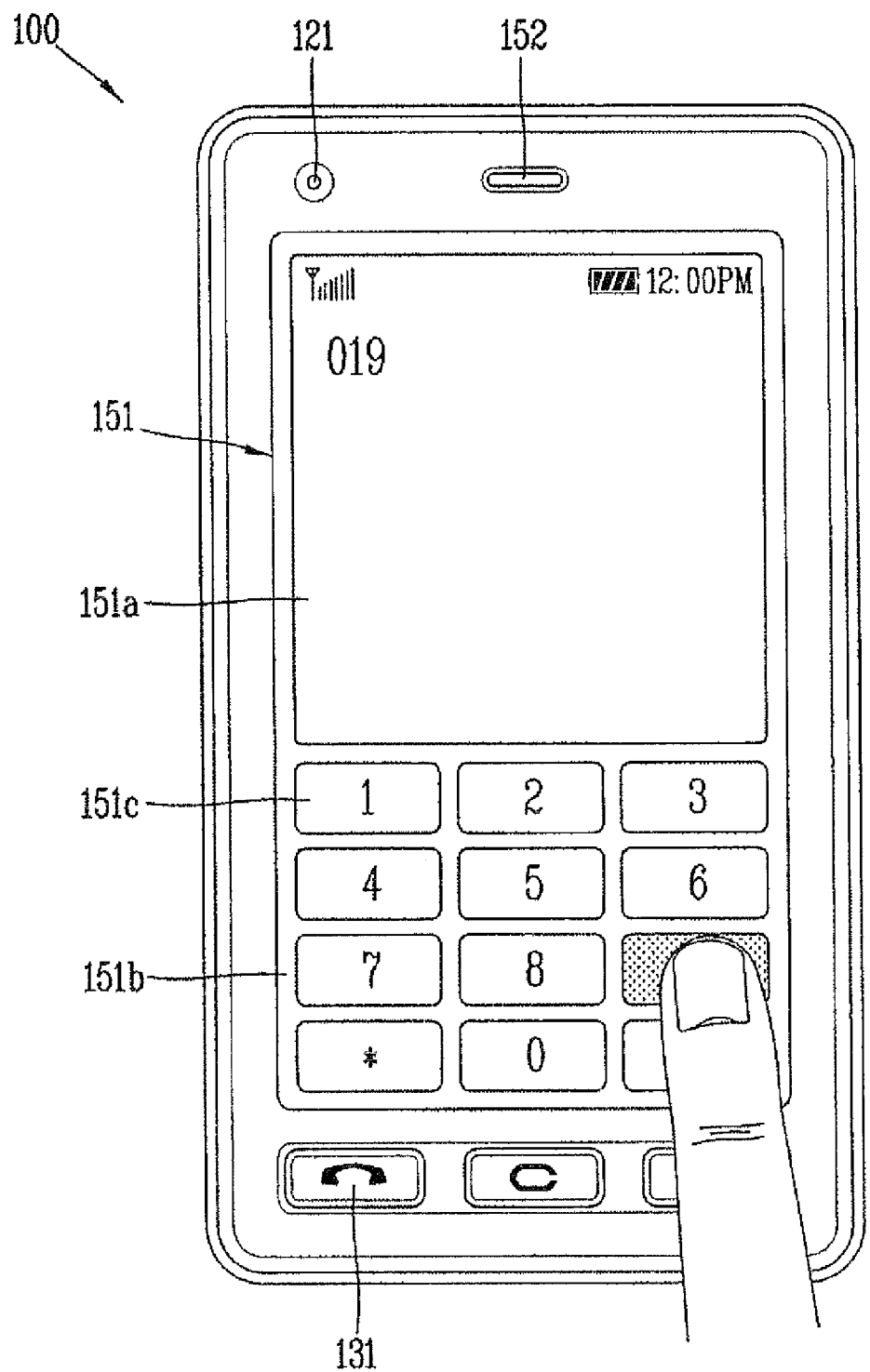
FIGS. 3A and 3B are front views showing an operation state of the mobile terminal according to the present invention.
Figure 3B:
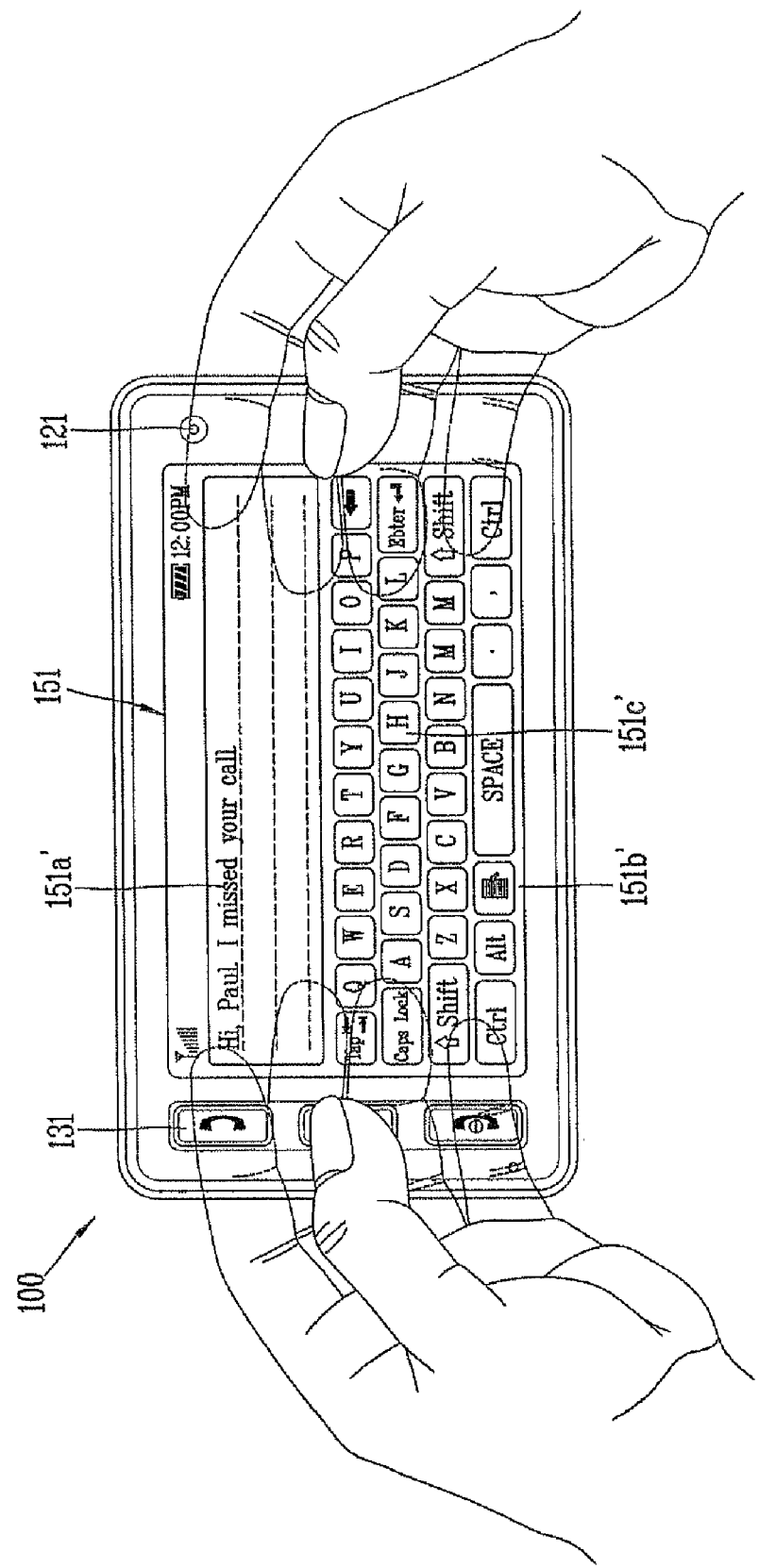

FIGS. 3A and 3B are front views of the mobile terminal to explain an operation state of the mobile terminal according to the present invention.

Various types of visual information may be displayed on the display unit 151. The information may be displayed in the form of texts, numbers, symbols, graphics, or icons.

For information input, at least one of the texts, numbers, symbols, graphics, or icons are displayed in constant arrangements, thereby being implemented as a keypad. This keypad may be referred to as 'soft keys'.

FIG. 3A shows a process that touch input applied to soft keys is received through a front surface of the terminal body.

The display unit 151 may be operated in the entire region, or in a plurality of divided regions. In the latter case, the display unit 151 may be configured such that the divided plurality of regions interwork each other.

For instance, an output window 151a and an input window 151b are respectively provided on upper and lower parts of the display unit 151. The output window 151a and the input unit 151b serve to output and input information, respectively. Soft keys 151c having numbers for inputting telephone numbers, etc. are implemented at the input window 151b. Once the soft keys 151c are touched, numbers, etc. corresponding to the touched soft keys are displayed on the output window 151a. When the first user input unit 131 is manipulated, performed is call connection to a telephone number displayed on the output window 151a.

FIG. 3B shows a process that touch input applied to the soft keys is received through a front surface of the terminal body.

FIG. 3A shows a portrait that the terminal body is vertically disposed, whereas FIG. 3B shows a landscape that the terminal body is horizontally disposed. The display unit 151 may be configured such that an output screen is converted according to an arrangement direction of the terminal body.

FIG. 3B shows that a text input mode is operated in the mobile terminal. The display unit 151 is provided with an output window 151a' and an input window 151b'. Soft keys 151c' on which at least one of texts, symbols and numbers are displayed may be arranged at the input window 151b in plurality in number. Once the soft keys 151c are touched, numbers, etc. corresponding to the touched soft keys are displayed on the output window 151a. The soft keys 151c' may be arranged in the form of QWERTY keys.

Once the soft keys 151c' are touched through the touch pad 135 (refer to FIG. 2B), texts, numbers, symbols, etc. corresponding to the touched soft keys are displayed on the output window 151a'. When compared with touch input through the display unit 151, the touch input through the touch pad 135 may prevent the soft keys 151c' from being blocked by a user's fingers. When the display unit 151 and the touch pad 135 are formed to be transparent, the user's fingers disposed on a rear surface of the terminal body can be recognized by the user's naked eyes. This allows the touch input to be more precise.

The display unit 151 or the touch pad 135 may be configured to receive touch input by a scroll as well as in the aforementioned manner. The user can move an entity on the display unit 151, such as a cursor or a pointer located on an icon, by scrolling the display unit 151 or the touch pad 135. Furthermore, when the user's fingers are to move on the display unit 151 or the touch pad 135, a moving path of the user's fingers may be visually displayed on the display unit 151. This may allow an image displayed on the display unit 151 to be effectively edited.

When the display unit 151 (touch screen) and the touch pad 135 are together touched within a predetermined time range, one function of the mobile terminal may be executed. The display unit 151 (touch screen) and the touch pad 135 are together touched when the user clamps the terminal body with using his or her thumb and index finger. Said one function of the mobile terminal may include activation or deactivation of the display unit 151 or the touch pad 135.

The proximity sensor 141 of FIG. 1 will be explained in more detail with reference to FIG. 4.

Figure 4:
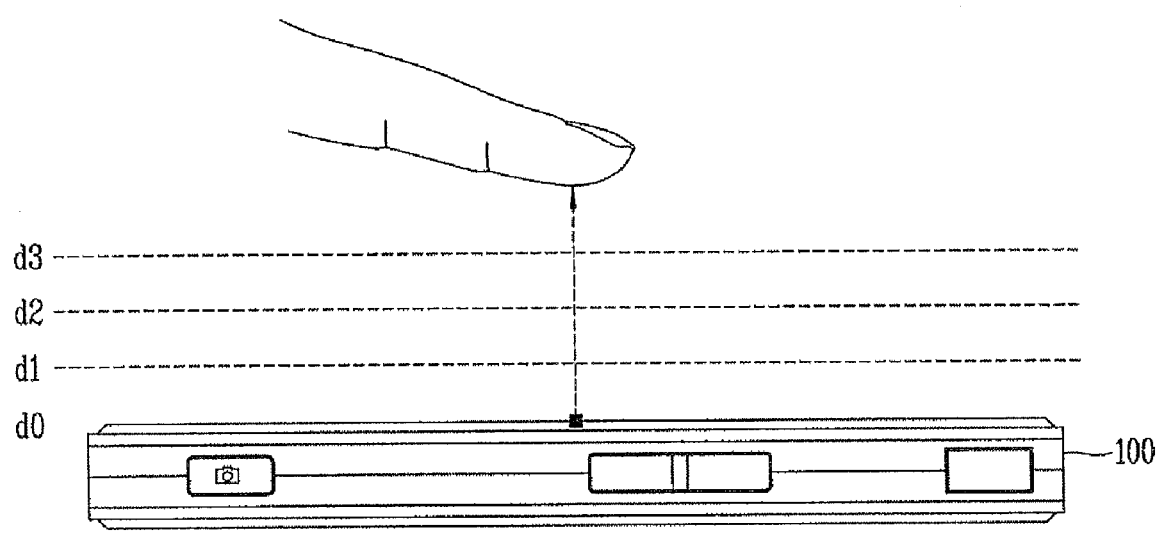
FIG. 4 is a conceptual view showing a proximity depth measured by a proximity sensor.

FIG. 4 is a conceptual view showing a proximity depth measured by a proximity sensor.

As shown in FIG. 4, when a pointer such as the user's finger or a pen is approaching to the touch screen, the proximity sensor 141 disposed in the touch screen or near the touch screen detects the pointer thus to output a proximity signal.

The proximity sensor 141 may be configured to output different proximity signals according to a distance between the pointer approaching to the touch screen and the touch screen (hereinafter, will be referred to as 'proximity depth').

FIG. 4 shows a sectional surface of the touch screen having a proximity sensor for sensing three proximity depths. Here, the proximity sensor may serve to sense proximity depths less than three, or more than four.

More concretely, when the pointer completely contacts the touch screen with a distance of 'd0', the controller recognizes the proximity distance as contact touch. When the pointer is spacing from the touch screen with a distance less than 'd1', the controller recognizes the proximity distance as proximity touch of a first proximity depth. When the pointer is spacing from the touch screen with a distance more than 'd1' and less than 'd2', the controller recognizes the proximity distance as proximity touch of a second proximity depth. When the pointer is spacing from the touch screen with a distance more than 'd2' and less than 'd3', the controller recognizes the proximity distance as proximity touch of a third proximity depth. When the pointer is spacing from the touch screen with a distance more than 'd3', the controller recognizes that the proximity touch has been released.

The controller 180 may recognize the proximity touch as various input signals according to a proximity depth and a proximity position of the pointer, and may perform various operational controls according to the various input signals.

Hereinafter, a method for controlling the mobile terminal according to the present invention will be explained in more detail with reference to the attached drawings.

Preferred embodiments to be later explained may be singularly used or in a combined manner with each other. And, the preferred embodiments to be later explained may be combined with the aforementioned user interface (UI).

Specific functions of the mobile terminal are provided with a plurality of detailed relevant menus. For instance, a camera function is provided with a flash ON/OFF menu, a photo size change menu, a timer setting menu, or a zoom setting menu.

Once the specific functions are executed, detailed menus thereof are displayed on a screen in the form of icons. Here, the icons may be displayed together with key numbers or not according to an operation method of the mobile terminal. For instance, when the mobile terminal is operated in a key input manner, key numbers for selecting the icons are displayed. However, when the mobile terminal is operated in a touch input manner, the key numbers may not be displayed.

A user may select one of the detailed menus in a key input manner or in a touch input manner. If the user knows well about the operation of the respective icons, he or she can immediately select an icon to perform a desired function. However, if the user does not know well about the operation of the respective icons, he or she has to execute all the icons one by one.

Accordingly, the present invention provides a method for outputting information relating to specific objects among objects displayed in the form of icons or thumb nails according to a user's manipulation. Here, the objects indicate at least one of menus relating to execution of functions of the mobile terminal, texts, images, and moving files stored in the mobile terminal, or web pages accessed through the mobile terminal. And, the object-related information indicates brief explanations about contents of the respective objects, or names of the objects, or help information relating to execution of the objects.

In the present invention, a display region having a wide area is usually obtained by displaying only icons indicating detailed menus. However, when a user manipulates the mobile terminal in a preset manner according to his or her necessity, information relating to a specific icon (e.g., brief explanations about contents of objects, or names of the objects, or help information relating to execution of the objects) is selectively displayed.

In the present invention, it is assumed that a camera function among a plurality of specific functions of the mobile terminal is executed. And, a method for displaying information relating to detailed menus of the camera function will be explained. As aforementioned, in the present invention, non only menus relating to functions of the mobile terminal, but also information relating to texts, images, moving image files, or web pages can be displayed.

Figure 5:
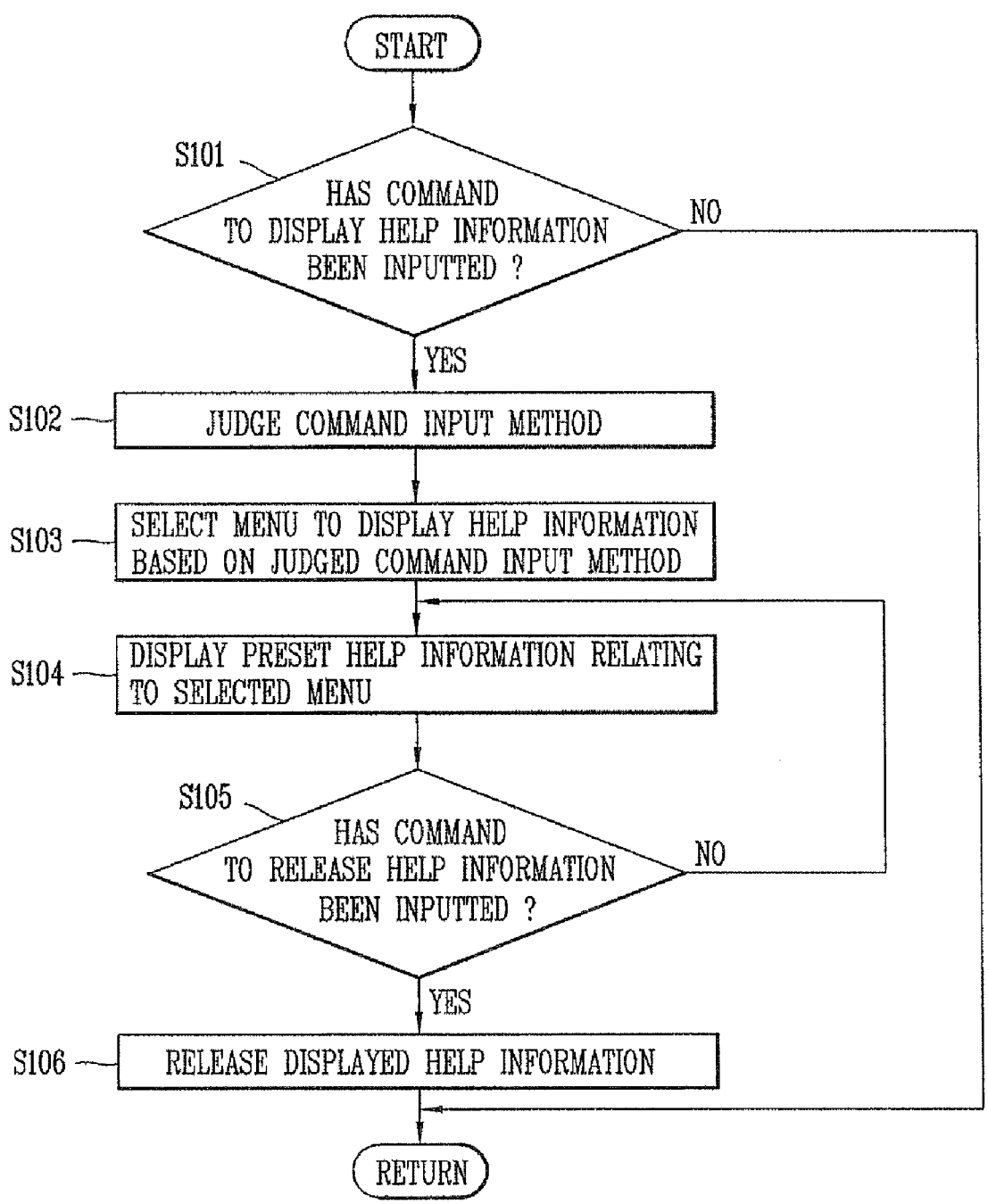
FIG. 5 is a flowchart showing a method for displaying help information of the mobile terminal according to the present invention.

FIG. 5 is a flowchart showing a method for displaying help information of the mobile terminal according to the present invention.

The controller 180 detects whether the mobile terminal is manipulated by a user in a preset manner or not. That is, the controller 180 detects whether a command to display preset help information (hereinafter, will be referred to as help information display command) has been input in a preset manner (S101).

The help information display command may be variously input as follows.

For instance, when a preset specific key is inputted, it may be judged that help information display command has been input.

Also, when the mobile terminal is shaken or tilted (inclined) to a preset direction, it may be judged that help information display command has been input. Also, when an impact is input from a preset specific direction, or a voice command is inputted or a user's breath is blown out through a microphone, it may be judged that help information display command has been input. Also, when a preset gesture (e.g., hand shape) or a proximity touch is inputted, it may be judged that help information display command has been input. The above methods for inputting help information display command may be applied independently, or in a combined manner with each other.

Once help information display command is inputted, the controller 180 judges an input method of the help information display command (S102). Then, the controller 180 automatically selects menus to display help information based on the input method (S103). Here, the menu may be displayed in the form of an icon or a thumbnail image.

For instance, in the case that the menus are aligned in columns and rows in one direction, both the menus aligned in the column and the menus aligned in the rows may be selected. Here, either the menus aligned in the column, or the menus aligned in the rows may be selected in a proximity touch input manner, thereby displaying help information.

Once a menu to display help information is selected, the controller 180 automatically displays preset help information (or name) relating to the selected menu (S104).

The help information is displayed as an upper layer of all the information displayed on a screen. The help information may be displayed with having an image of a specific shape (e.g., balloon shape) as a background. The help information may have controlled transparency such that information of lower layers is displayed. A background image of the help information may be configured to have a shape having one sharp side so as to indicate an icon represented by the help information.

Once a command to release displayed help information is inputted (S105), the controller 180 releases the displayed help information (S106). That is, the controller 180 may make the help information disappear. Also, the controller 180 may set the help information to be displayed for a preset time, and then to automatically disappear.

In the case that one menu is selected before the preset time lapses, help information of each menu may be set to disappear. Or, the help information may be set to disappear when a preset command (hereinafter, a command to release displayed help information) is inputted. The command to release displayed help information may be input in the same manner as the command to display help information. For instance, the operation of the mobile terminal when a command is inputted before help information is displayed may be opposite from that when a command is inputted in the same manner after the help information is displayed.

Figure 6:
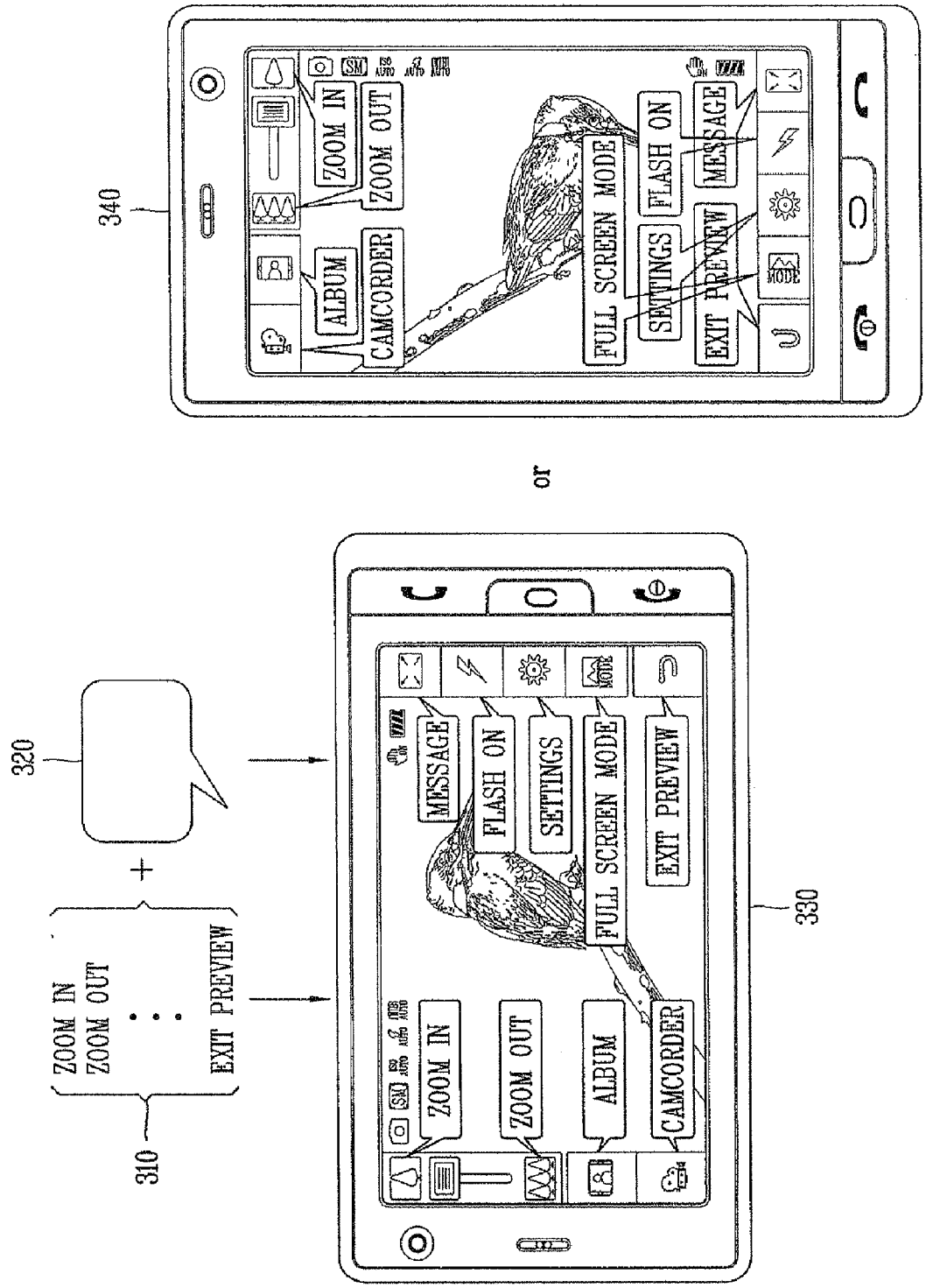
FIG. 6 is an exemplary view showing a screen for displaying information relating to objects in the mobile terminal according to the present invention.

FIG. 6 is an exemplary view showing a screen for displaying object-related information in the mobile terminal according to the present invention.

As shown, the controller 180 may display object-related information such as information indicating brief explanations about contents of the respective objects, or names of the objects, or help information relating to execution of the objects.

The object-related information may display detailed functions or names of menus (hereinafter, will be referred to as a help information text 310) indicated by each icon. Alternatively, files (e.g., texts, images, moving images, etc.) indicated by each thumbnail, names (or titles) or contents of web pages may be briefly displayed.

A name or contents 310 of the help information text may have a limitation to be displayed by a preset length (e.g, five words). When the length of the help information text is to be limited, an abbreviation mark (e.g., . . . , ▶, ~) may be additionally displayed. Here, the files or web pages may not be displayed as thumbnail images, but may be displayed with a reduced size.

The help information may be displayed with only texts, or with texts and an images 320 of a specific shape (e.g., balloon shape) (330, 340). In the case that the help information is displayed with only texts, the texts may be displayed with frames of specific colors so as to be distinguished from background images.

The help information texts and the background images are displayed as upper layers of all the information displayed on a screen. For instance, the help information (e.g., help information texts, help information background images) may be displayed as upper information of menu icons or thumbnail images.

If the help information is displayed in an overlapped state with each other, an upper layer thereof is displayed by any preset priority. Once one of the help information is selected by a user, a layer of the selected help information is determined as an uppermost layer.

The object-related Information (e.g., texts or background images) may have its controlled transparency so that information of lower layers displayed on a screen can be seen. The background image of the help information may be configured to have a shape having one sharp side so as to indicate an icon or thumbnail represented by the help information.

Even if the position of icons is not changed according to a tilt of the mobile terminal, a direction to display help information of the respective icons may be changed. That is, help information of the respective icons may be displayed toward a front direction so that a user can always read the help information text without any difficulties. A shape or size of the background image 320 may be changed according to a posture of the mobile terminal (e.g., horizontal direction 330, vertical direction 340). However, the help information text may be always displayed toward a front direction regardless of the posture of the mobile terminal (e.g., horizontal direction, vertical direction).

FIGS. 7A to 7F are examples showing a menu displaying method when a command to display help information is inputted according to the present invention.

As shown in FIG. 7A, once a preset specific key is inputted (350), the controller 180 may display help information of all the icons displayed on a screen (360). Whenever the specific key is inputted, help information of the icons displayed in a specific column or row direction may be sequentially displayed according to a preset order. When sequentially displaying the help information of the plurality of icons displayed on the screen, the help information is preferably displayed without overlapping with each other.

Here, the help information may be displayed in a combined manner of two methods. For instance, once the specific key is inputted, help information of all the icons is wholly displayed (360). Then, once the specific key is one more input, the help information of all the displayed icons is made to disappear. Then, help information of the icons displayed in a preset column or row direction is displayed (370). Whenever the specific key is consecutively input, the help information of the icons displayed in a specific column or row direction may be displayed according to the sequent orders (380).

Figure 7B:
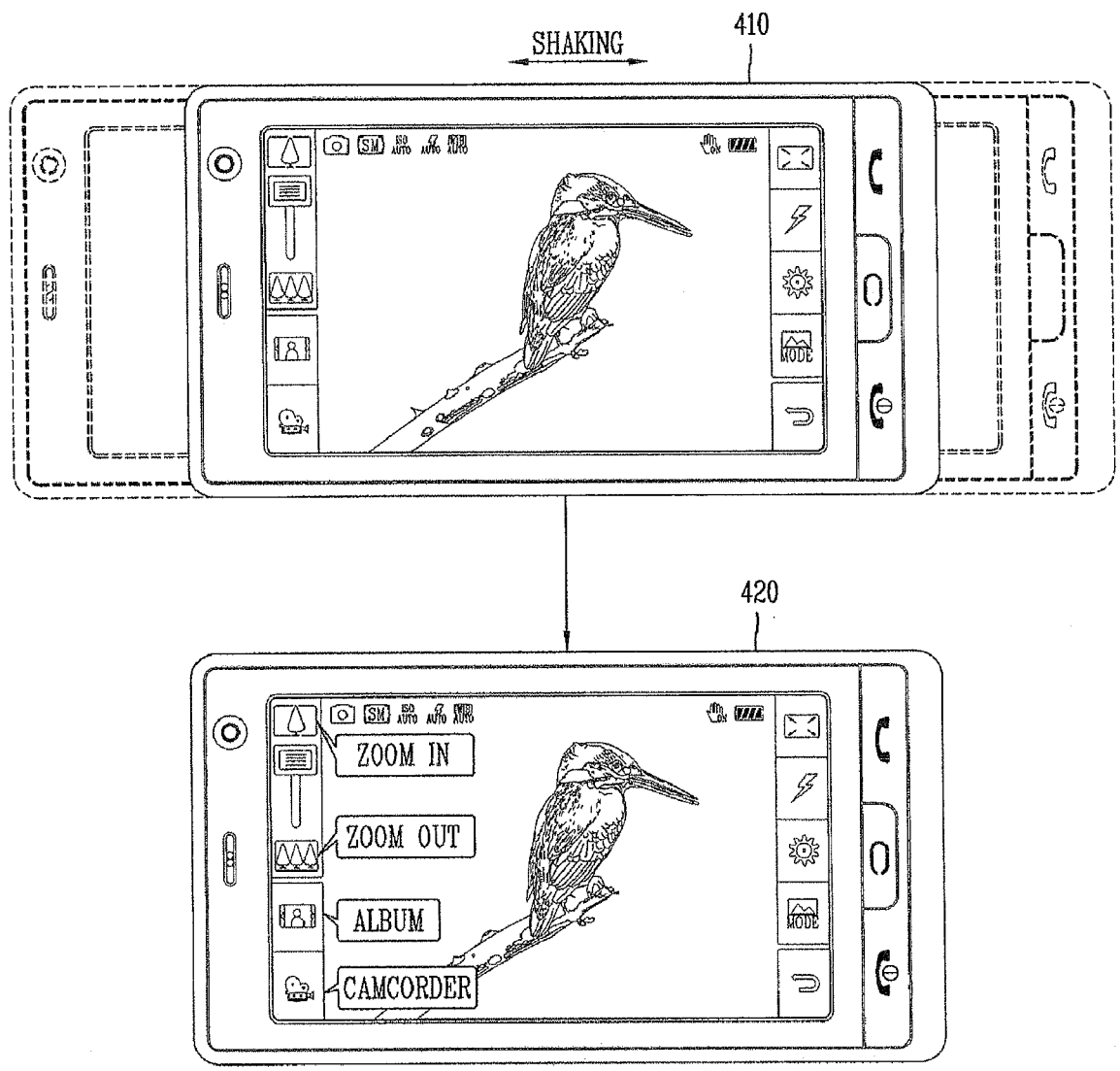

Referring to FIG. 7B, when the mobile terminal is shaken to a preset direction (410), the controller 180 may display help information of the icons displayed on one or more side surfaces of the screen along the shaken direction (420).

The controller 180 may use the sensing unit 140 so as to detect the shaken direction. The controller 180 judges whether a direction, an acceleration value, etc. detected by the sensing unit 140 exceed threshold values, thereby discriminating whether the mobile terminal has merely shaken or has been strongly shaken for display of help information.

For instance, when the mobile terminal is shaken to the left side from the right side, help information of the icons displayed on the right side of the screen may be displayed. On the contrary, when the mobile terminal is shaken to the right side from the left side, help information of the icons displayed on the left side of the screen may be displayed. When the help information is displayed, animation effects may be provided. For example, when the mobile terminal is shaken to the left side from the right side, help information of the icons displayed on the right side of the screen may be displayed as rolled paper is unfolded.

When the mobile terminal is shaken to the lower side from the upper side, help information of the icons displayed on the upper side of the screen may be displayed. On the contrary, when the mobile terminal is shaken to the upper side from the lower side, help information of the icons displayed on the lower side of the screen may be displayed.

Referring to FIG. 7C, when the mobile terminal is tilted toward a preset direction (430, 431), the controller 180 may display help information of the icons displayed on one or more side surfaces of the screen according to the tilted direction (440). Here, a tilted state of the mobile terminal indicates a downwardly tilted state of the mobile terminal by an angle more than a preset angle.

When the left side of the mobile terminal is downwardly tilted, the controller 180 may display help information of the icons displayed on the right side of the screen. On the contrary, when the right side of the mobile terminal is downwardly tilted, the controller 180 may display help information of the icons displayed on the left side of the screen. When the mobile terminal tilted toward the left side is tilted toward the right side, help information of the icons displayed on the right side of the screen may disappear, whereas help information of the icons displayed on the left side of the screen may be displayed. That is, the help information may be set to be consecutively displayed or to disappear according to a changed tilt direction of the mobile terminal.

A reference angle used to detect a tilt of the mobile terminal may be differently set according to each direction. For instance, an angle to connect the right and left sides of the screen (horizontal angle) may be differently set from an angle to connect the upper and lower sides of the screen (vertical angle). The angle to connect the upper and lower sides of the screen (vertical angle) is set with an angle tilted by a predetermined angle (pre-tilted angle) in accordance with a user's viewing. Accordingly, the mobile terminal is judged to have been tilted when it is tilted by an angle more than the pre-tilted angle.

Figure 7D:
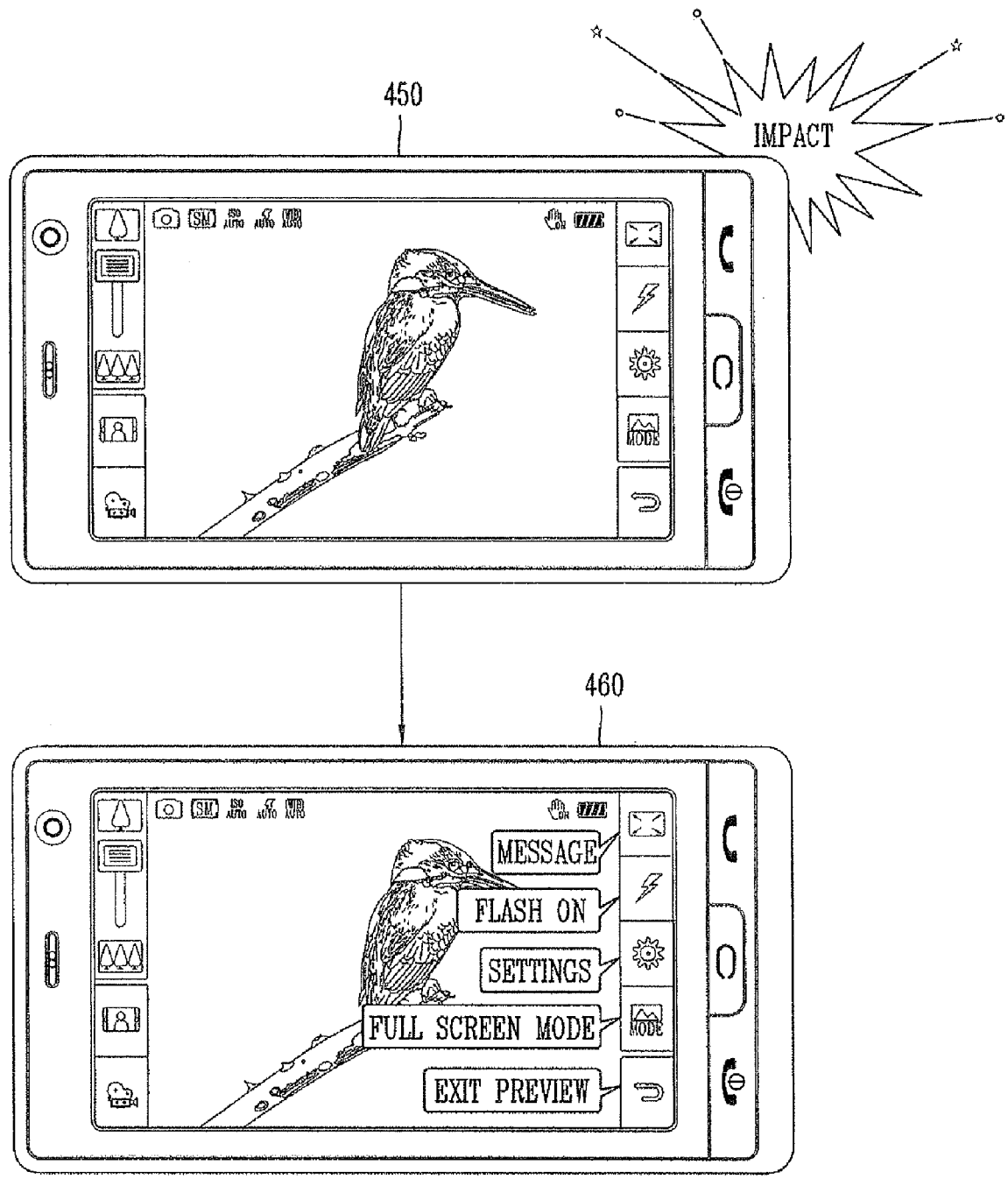

Referring to FIG. 7D, when an impact is inputted in a preset direction of the mobile terminal (450), the controller 180 may display help information of the icons displayed on one or more side surface of the screen in the preset direction (460).

The help information of the icons displayed on one or more side surface of the screen may be displayed or may disappear according to the number of times that an impact is inputted. For instance, when an impact is inputted onto the left side of the mobile terminal, help information of the icons displayed on the left side of the screen may be displayed. However, when an impact is inputted onto the right side of the mobile terminal, help information of the icons displayed on the right side of the screen may be displayed. Likewise, when an impact is inputted onto the upper or lower side of the mobile terminal, help information of the icons displayed on the upper or lower side of the screen may be displayed.

Here, the controller 180 may detect an inputted impact by using the sensing unit 140. When a detected impact value is more than a threshold value, the controller 180 may judge that an impact has been inputted. In the case that the help information is displayed, and then an impact is inputted in the same or different direction as/from the display direction of the help information, the displayed help information may disappear.

Figure 7E:
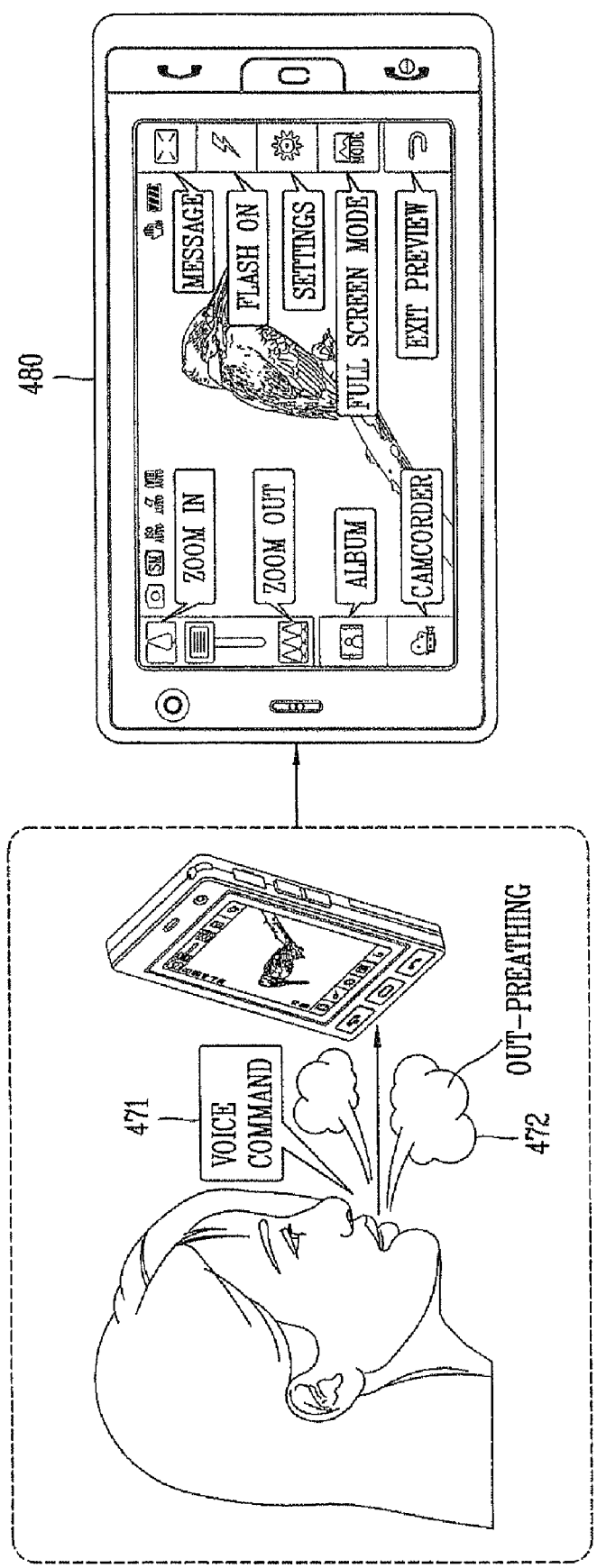

Referring to FIG. 7E, a preset voice command 471 is inputted through the microphone 122 of the mobile terminal, the controller 180 may display help information of icons corresponding to the voice command (480). Alternately, the controller 180 may display help information of icons when a user's breath is blown out through the microphone 122 (480). In the case that the user's breath is blown out in a manner to inflate a balloon, the controller 180 may display help information of all the icons displayed on the screen.

The controller 180 may judge, through a user's out-breathing sound (e.g., hoo ~~~~~) inputted through the microphone 122, that a user's out-breathing has been inputted. Also, the controller 180 may judge, through an intensity of the user's out-breathing sound, an intensity of the user's out-breathing sound. The controller 180 may select icons to output help information based on the intensity of the user's inputted out-breathing. For instance, when the user's inputted breath has a weak intensity (less than a threshold value), the controller 180 may display help information of icons located near the microphone 122. On the contrary, when the user's inputted out-breathing has a strong intensity (more than a threshold value), the controller 180 may display help information of all the icons displayed on the screen.

Figure 7F:
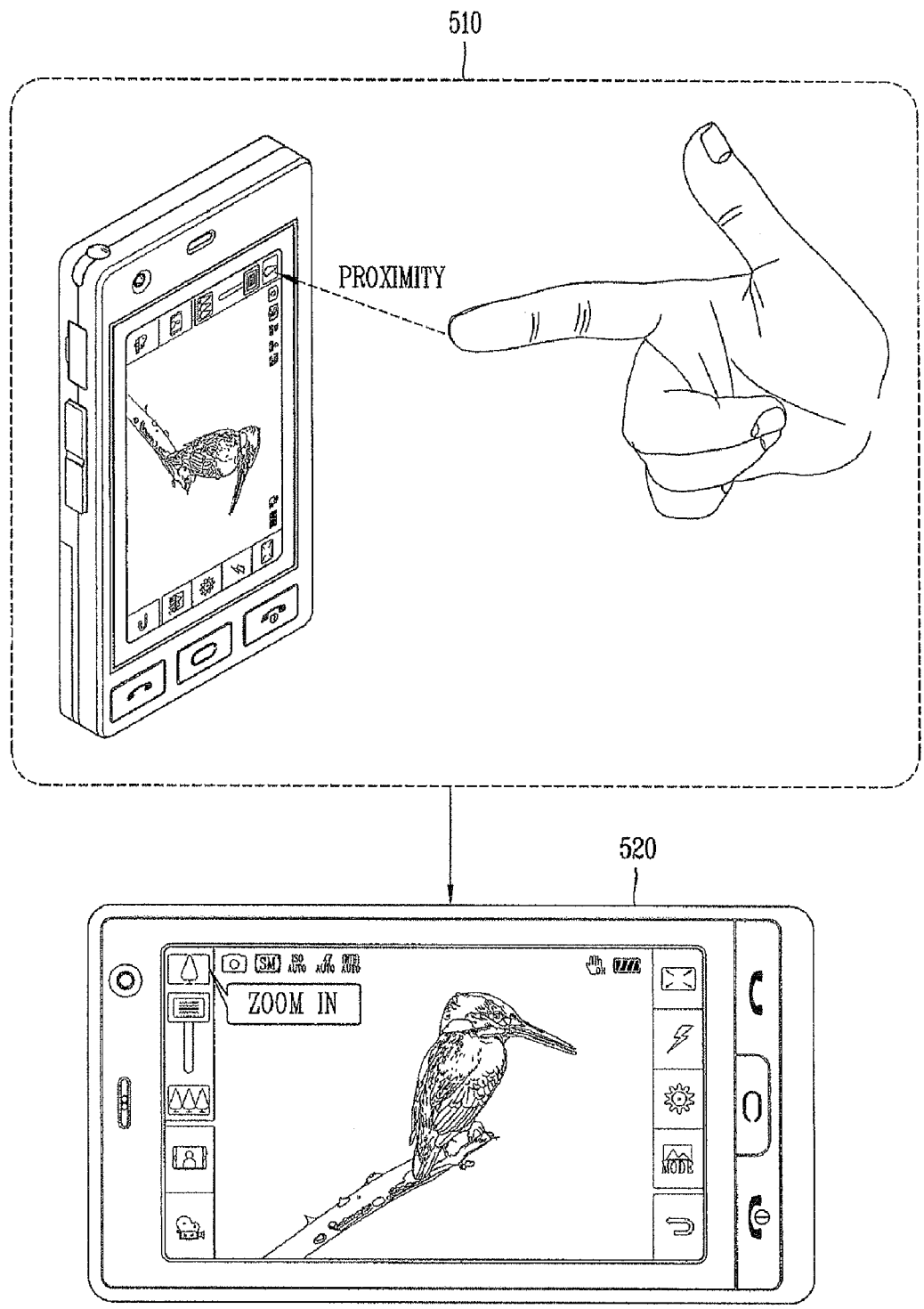

Referring to FIG. 7F, when a pointing means (e.g., finger) is approaching to one of the icons displayed on the screen (510), the controller 180 may detect the approached icon and display help information corresponding to the approached icon (520). However, when the pointing means is spacing from the icon, the controller 180 may make the displayed help information disappear. In the case that an entire part of the finger in a length direction is approaching to a plurality of icons, not the end of the finger is approaching to a specific icon, help information of the plurality of icons may be displayed.

In the aforementioned embodiments, a method for displaying help information of icons was explained. However, the method may be applied to a method for displaying help information of files (e.g., texts, images, moving images, etc.) or web pages.

Figure 8:
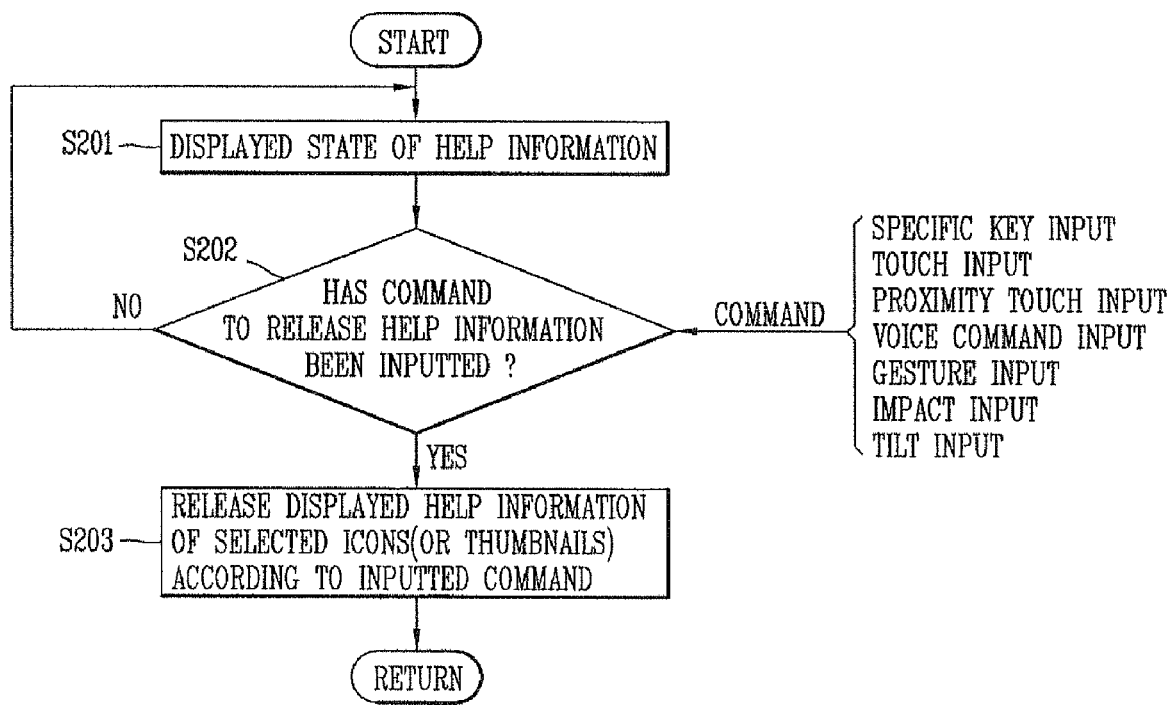
FIG. 8 is a flowchart showing a method for disappearing displayed help information according to the present invention.

FIG. 8 is a flowchart showing a method for disappearing displayed help information according to the present invention.

It is assumed that help information of specific icons has been displayed through the aforementioned methods (S201).

When a command to release displayed help information is inputted in various manners such as a preset specific key input, a touch input, a proximity touch input, a voice command input, or a gesture input (S202), the controller 180 may make the displayed help information of a selected specific icon (or thumbnail) disappear (S203).

The controller 180 may make help information of a specific icon disappear in a preset specific manner. For instance, help information is consecutively touched two times, the help information may disappear or may be displayed with a small size. The controller 180 may make the displayed help information automatically disappear after a predetermined time lapses. When one icon is selected before the predetermined time lapses, menus corresponding to the selected icon may be executed while all the help information disappear.

When one help information (help information text, help information background image) rather than the specific icon is selected, the selected help information may be more specifically displayed That is, the brief help information may be displayed in a more specific manner, or in a more emphasized manner. The help information displayed with changes may be maintained for a preset specific time. And, help information having not been selected may be displayed with a decreased size, or may disappear.

In the aforementioned embodiments, a method for selecting an icon to display help information was explained. However, under a state that the help information has been displayed, the help information may be changed to have a decreased or increased size according to an inputted command. For instance, when the mobile terminal is tilted to one direction, displayed help information may be expanded to have an increased size. However, when the mobile terminal is tilted to another direction, the expanded help information may be contracted to have a decreased size.

In the mobile terminal according to one or more embodiments of the present invention, information relating to specific objects among objects displayed on the screen is automatically displayed according to a user's manipulation. Accordingly, the user's convenience is enhanced.

Furthermore, in the mobile terminal according to the present invention, information relating to specific objects displayed on the screen is automatically displayed or is made to disappear according to a user's manipulation. Accordingly, a novice not accustomed to the functions of the mobile terminal can easily use the mobile terminal.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
    a user input unit;
    a display unit to display a plurality of objects on a screen; and
    a controller for controlling information relating to specific objects from among the plurality of objects displayed on the display unit, wherein in response to receiving a first user input, the controller displays the plurality of objects and a plurality of identifying information on the screen, wherein each of the displayed plurality of identifying information is associated with a different one of the displayed plurality of objects, and
    wherein in response to receiving a second user input, the controller displays the plurality of objects and removes the displayed identifying information for at least two of the plurality of objects while maintaining the display of the identifying information for at least a remaining one of the plurality of objects.

2. The mobile terminal of claim 1, wherein the plurality of objects are displayed as icons or thumbnail images.

3. The mobile terminal of claim 1, wherein the plurality of objects comprise at least one of
   menus relating to execution of functions of the mobile terminal;
   texts, images, or moving image files stored in the mobile terminal; or web pages accessed through the mobile terminal.

4. The mobile terminal of claim 1, wherein the plurality of identifying information relating to the plurality of objects includes brief explanations about contents of the respective plurality of objects, or names of the plurality of objects, or help information relating to execution of the plurality of objects.

5. The mobile terminal of claim 1, further comprising a sensing unit for sensing a user's manipulation inputted in at least one manner of a voice command input, an out-breathing input, an impact input, shaking of the mobile terminal, or a tilt of the mobile terminal.

6. The mobile terminal of claim 1, wherein the controller displays information relating to:
   one specific object among the plurality of objects displayed on the screen, or
   specific objects aligned in a column direction or a row direction of the screen, or
   all the plurality of objects displayed on the screen.

7. The mobile terminal of claim 1, wherein the controller removes the displayed plurality of identifying information when a preset time lapses, or when a command is received to release the displayed plurality of identifying information.

8. A method for controlling a mobile terminal, comprising:
   displaying a plurality of objects on a screen of the mobile terminal;
   receiving a first user input;
   in response to receiving the first user input, displaying the plurality of objects and a plurality of identifying information on the screen, wherein each of the displayed plurality of identifying information is associated with a different one of the displayed plurality of objects;
   receiving a second user input; and
   in response to receiving the second user input, displaying the plurality of objects and removing the displayed identifying information for at least two of the plurality of objects while maintaining the display of the identifying information for at least a remaining one of the plurality of objects.

9. The method of claim 8, wherein the plurality of objects comprise at least one of:
   menus relating to execution of functions of the mobile terminal;
   texts, images, or moving image files stored in the mobile terminal; or
   web pages accessed through the mobile terminal.

10. The method of claim 8, wherein the first user input is inputted in at least one manner of a voice command input, an out-breathing input, a key input, an impact input, a touch input, a proximity input, shaking of the mobile terminal, or a tilt of the mobile terminal.

11. The method of claim 8, wherein the specific objects that display the identifying information are one of:
    one specific object among the plurality of objects displayed on the screen, or
    specific objects aligned in a column direction or a row direction of the screen, or
    all the plurality of objects displayed on the screen.

12. The method of claim 8, wherein the identifying information is displayed as an uppermost layer of other information displayed on the screen.

13. The method of claim 8, wherein the identifying information is displayed by using a background image having a specific shape such as a balloon shape.

14. The method of claim 13, wherein the background image has its shape or size changed based on a tilt of the mobile terminal.

15. The method of claim 8, wherein the identifying information is text information.

16. The method of claim 8, wherein the user input is from a user input unit or the screen.

17. The method of claim 8, wherein the plurality of objects are displayed on a side of the display unit in a form of a column.

18. The method of claim 8, wherein the plurality of objects are all aligned with each other on a side of a screen of the display unit.

19. The mobile terminal of claim 1, wherein the identifying information is text information.

20. The mobile terminal of claim 1, wherein the user input is from the user input unit or the screen.

21. The mobile terminal of claim 1, wherein the plurality of objects are displayed on a side of the screen in a form of a column.

22. The mobile terminal of claim 1, wherein the plurality of objects are all aligned with each other on a side of the screen.

23. A mobile terminal, comprising:
    a user input unit;
    a display unit to display a plurality of objects on a screen; and
    a controller for controlling information relating to specific objects from among the plurality of objects displayed on the screen, wherein in response to receiving a user input based on movement of the mobile terminal, the controller displays the plurality of objects and a plurality of identifying information on the screen, wherein each of the displayed plurality of identifying information is associated with a different one of the displayed plurality of objects, and wherein the information is displayed at a position based on a direction of the movement of the mobile terminal.

24. The mobile terminal of claim 23, wherein the movement is a tilting of the mobile terminal.

25. The mobile terminal of claim 23, wherein the movement is a shaking of the mobile terminal.

26. The mobile terminal of claim 23, wherein the movement is rotating of the mobile terminal, and the displayed identifying information rotates such that the identifying information is displayed upright with respect to a user.

27. The mobile terminal of claim 23, wherein the plurality of objects are displayed on a side of the screen in a form of a column.

28. The mobile terminal of claim 23, wherein the plurality of objects are all aligned with each other on a side of the screen.

29. A method of controlling a mobile terminal, comprising:
    displaying a plurality of objects on a screen the mobile terminal; and
    receiving a first user input based on movement of the mobile terminal; and
    in response to receiving the first user input based on the movement of the mobile terminal, displaying the plurality of objects and a plurality of identifying information on the screen, wherein each of the displayed plurality of identifying information is associated with a different one of the displayed objects, and wherein the information is displayed at a position based on a direction of the movement of the mobile terminal.

* * * * *